United States Patent

Dudley et al.

Patent Number: 5,989,419
Date of Patent: Nov. 23, 1999

[54] SPINNER FOR CLEANING CARTRIDGE-TYPE WATER FILTERS

[76] Inventors: David E. Dudley, 2673 Million Ct., San Jose, Calif. 95148; Joseph D. Robertson, 5164 Selma Ave., Fremont, Calif. 94536

[21] Appl. No.: 09/038,178

[22] Filed: Mar. 2, 1998

[51] Int. Cl.⁶ .............................................. E04H 3/16
[52] U.S. Cl. .................... 210/169; 210/232; 210/238; 210/391; 210/409; 210/416.2; 134/138; 134/152; 4/496
[58] Field of Search ............................. 210/772, 106, 210/107, 156, 169, 232, 238, 354, 391, 409, 416.2; 4/490, 496; 134/137, 138, 144, 152

[56] References Cited

U.S. PATENT DOCUMENTS

| | | |
|---|---|---|
| 1,034,938 | 8/1912 | Volckening . |
| 2,223,104 | 11/1940 | Hansen . |
| 2,475,702 | 7/1949 | Funke . |
| 2,608,952 | 9/1952 | Herbert . |
| 3,608,567 | 9/1971 | Neill, Jr. . |
| 3,650,283 | 3/1972 | Lang . |
| 4,668,384 | 5/1987 | Holman . |
| 4,941,971 | 7/1990 | Albright . |
| 5,203,990 | 4/1993 | Garguilo . |
| 5,330,065 | 7/1994 | Bradley . |
| 5,384,045 | 1/1995 | Chmielewski et al. . |
| 5,423,977 | 6/1995 | Aoki et al. . |

Primary Examiner—David A. Simmons
Assistant Examiner—Fred Prince
Attorney, Agent, or Firm—Thomas E. Schatzel; Law Offices of Thomas E. Schatzel, A Prof. Corp.

[57] ABSTRACT

A cartridge-filter cleaning spinner comprises a handheld spindle rod that can accommodate a variety of filter sizes. The spindle rod has two inward pointing slip-ring hand-tightened hubs. A cartridge filter is loaded on the spindle rod by removing one of the slip-ring hand-tightened hubs, slipping the cartridge filter onto the spindle snug against the other slip-ring hand-tightened hub, and then reinstalling the first slip-ring hand-tightened hub on the spindle rod. The cartridge filter is then free to spin around while the spindle rod handles themselves remain stationary. A water jet from a garden hose is then directed at one end of the cartridge filter to one side so the cartridge filter begins spinning. The water jet is then worked down slowly to the opposite end while keeping the spinning action going. The process is then repeated, but with the water jet directed to the other side so the cartridge filter spins in the opposite direction. This helps both sides of the longitudinal outside pleats of the cartridge filter material to come clean. The cleaning is accomplished by centrifugal action and does not involve backwashing.

6 Claims, 4 Drawing Sheets

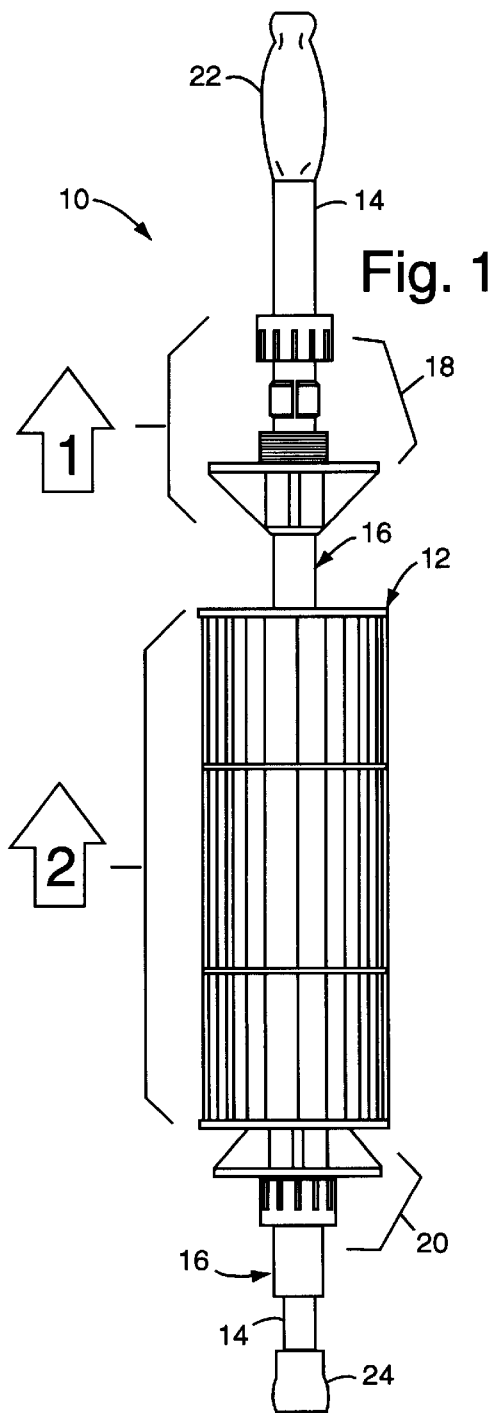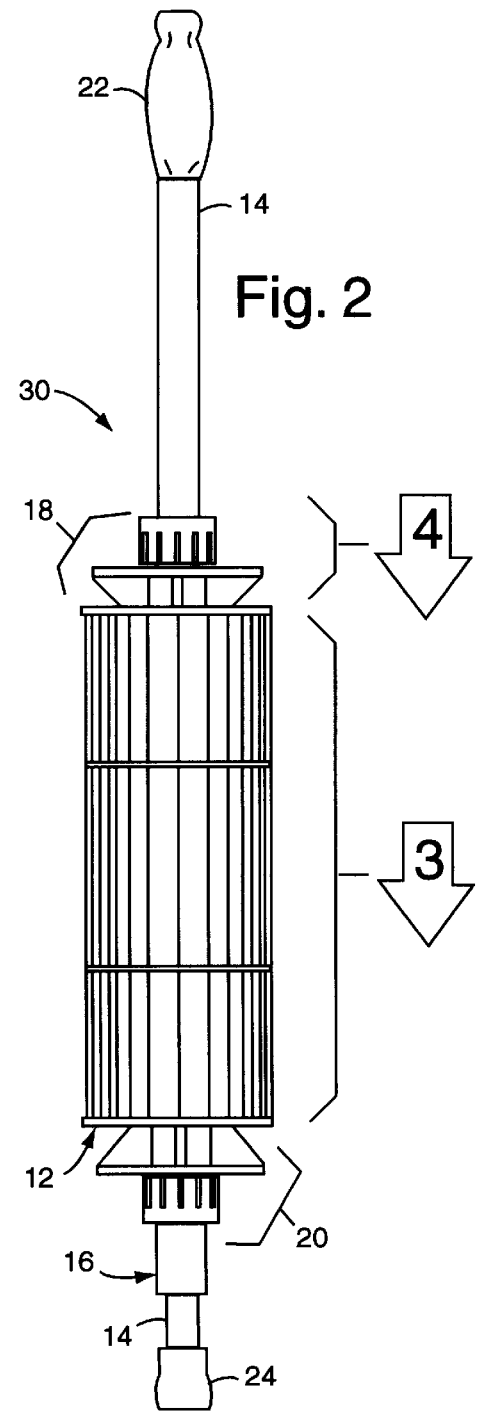

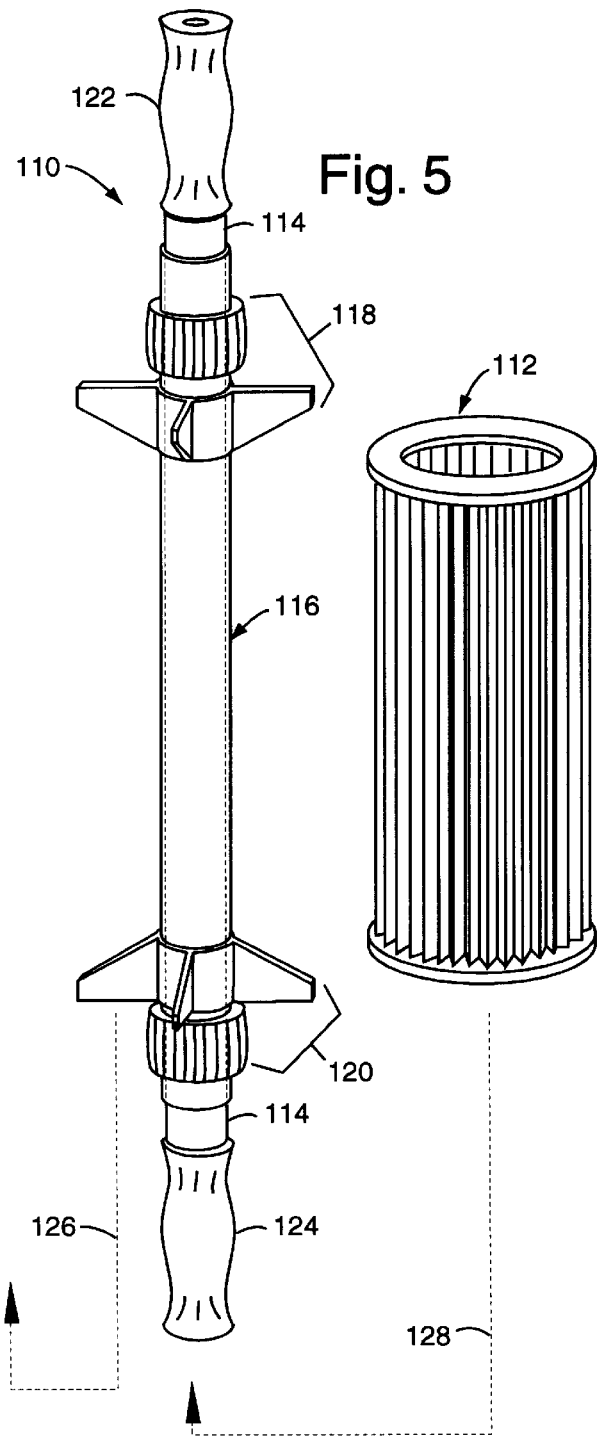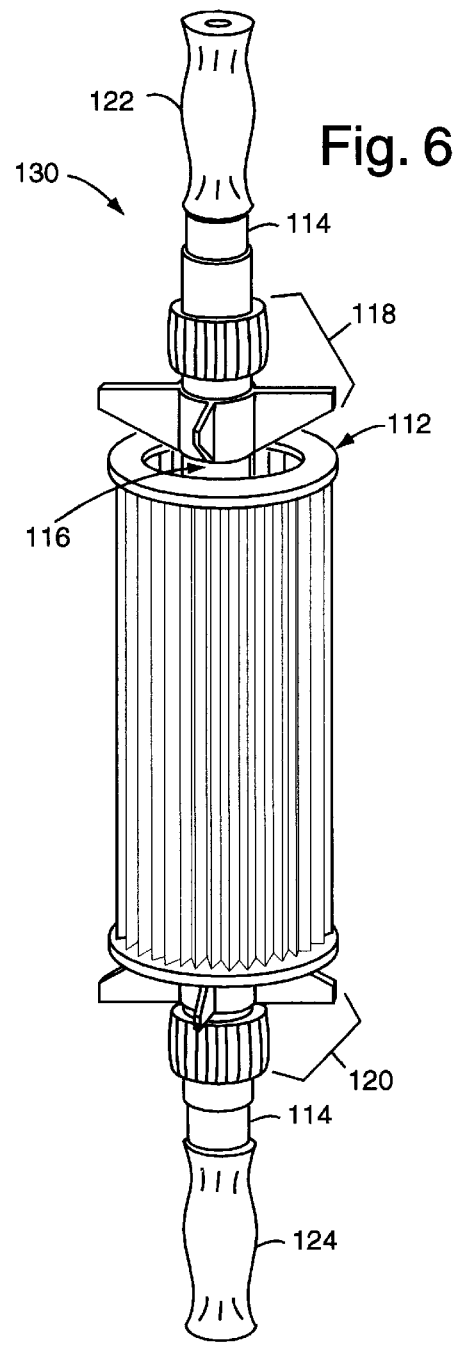

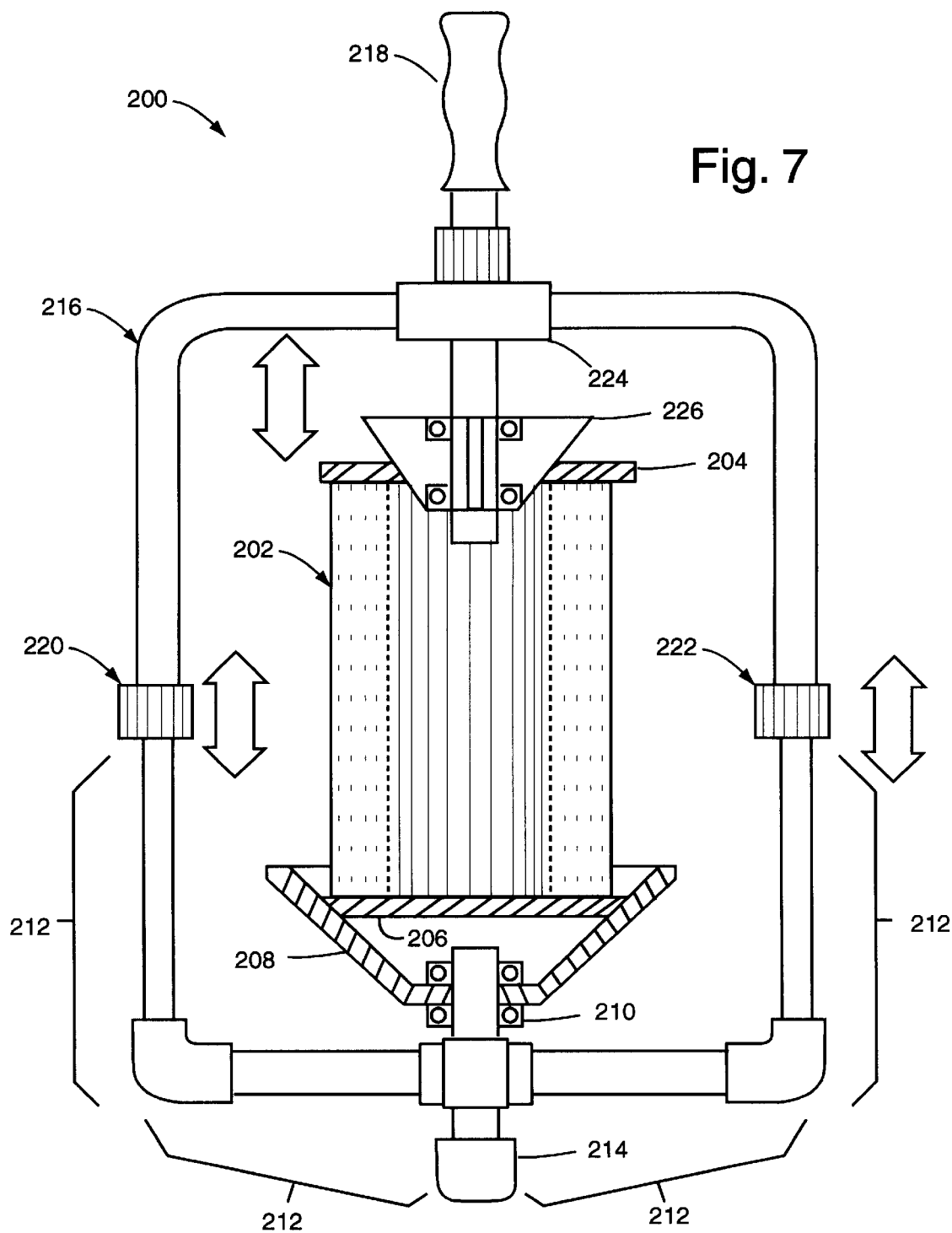

SPINNER FOR CLEANING CARTRIDGE-TYPE WATER FILTERS

BACKGROUND OF THE INVENTION

1. Field of the Invention

The invention relates generally to cartridge-type water filters and more specifically to centrifugal cleaning such cartridge filter elements by spinning them on an axle with a water jet.

2. Description of the Prior Art

The typical swimming pool recirculation pump is a centrifugal pump which moves the water by centrifugal force. Water is drawn into the eye of the impeller and then thrown from the outer perimeter of the whirling impeller into the chamber enclosing the impeller and then forced into the piping system. If the water has been filtered prior to reaching the pump, at the suction side of the pump, it is discharged from the pump directly back to the pool. The filter system may be either a vacuum or gravity system. If the water has not been filtered, it is discharged from the pump to a filter station and then on to the pool. This is a so-called pressure system since the water is delivered to the filters under pressure.

Filtration is the physical process of removing dirt particles and solids to prevent impeding the disinfection process and to promote clarity. Filtration, capable of removing some bacteria, is not a disinfection process. Disinfection is the chemical process of killing disease-causing bacteria and other types of microorganisms by maintaining a uniformly dispersed residual of some chemical, usually chlorine, in pool waters. The removal of bacteria by filtration is not considered particularly beneficial. The primary purpose of filtration is to remove all foreign particles which would otherwise increase the disinfectant demand of the water, thus lowering chlorine residuals and weakening the killing power of the chemicals that have been added to sterilize the water. Many alternatives are open to designers and builders to accomplish particle removal through filtration.

As the soil removal process takes place in the filter, the dirt accumulation increases resistance to flow and eventually reduces the flow below the specified amount. At that point the filter must be cleaned. Unicel (Burbank, Calif.) recommends cleaning the filter when the pump output pressure rises 8–10 PSI above the initial or new cartridge starting pressure. Conversely, when the filter is cleaned and returned to service, resistance to flow is at its minimum and flow is at its maximum. Thus, it can be seen that the swimming pool pump output varies over the filter life of the cartridge.

There are five basic filter types traditionally used, e.g., pressure sand, pressure diatomaceous earth, vacuum diatomaceous earth, gravity sand, and cartridge.

Cartridge filter manufacturers typically recommended cleaning the cartridge by first removing it from the filter housing, and rinsing it with a garden hose to remove loose debris. Commercial cartridge cleaners are suggested, e.g., GUARDEX Filter Cleaner. To remove calcium or mineral buildup, the cartridge is soaked in a separate solution of one part muriatic acid to twenty parts water until the bubbling stops. The element is thoroughly rinsed before putting it back in the filter housing. All oils and cleaning solution must be removed from the cartridge before soaking it in the acid solution, otherwise the acid reactions with the residue will permanently clog the filter material.

A typical cartridge filter takes about twenty minutes to clean with a garden hose because each of the longitudinal pleat folds must be combed with water. The force of the water is also pushing the filter cake deeper into the filter medium since the dirt buildup typically occurs on the outside diameter.

SUMMARY OF THE PRESENT INVENTION

It is therefore an object of the present invention to provide device to assist a pool owner or caretaker in the easy and effective cleaning of cartridge filters.

It is another object of the present invention to provide an automatic filter-cartridge cleaning mechanism that can be initiated on a periodic schedule.

Briefly, a cartridge-filter cleaning spinner embodiment of the present invention comprises a handheld spindle rod that can accommodate a variety of filter sizes. The spindle rod has two inward pointing slip-ring hand-tightened hubs. A cartridge filter is loaded on the spindle rod by removing one of the slip-ring hand-tightened hubs, slipping the cartridge filter onto the spindle snug against the other slip-ring hand-tightened hub, and then reinstalling the first slip-ring hand-tightened hub on the spindle rod. The cartridge filter is then free to spin around while the spindle rod handles themselves remain stationary.

A water jet from a garden hose is then directed at one end of the cartridge filter to one side so the cartridge filter begins spinning. The water jet is then worked down slowly to the opposite end while keeping the spinning action going. The process is then repeated, but with the water jet directed to the other side so the cartridge filter spins in the opposite direction. This helps both sides of the longitudinal outside pleats of the filter material to come clean.

Therefore the cleaning is accomplished by centrifugal action and does not involve backwashing.

An advantage of the present invention is that an apparatus for cleaning cartridge filters is provided that can clean automatically and can be initiated by a timer or by a switch which is activated when filter back pressure reaches a preset limit.

A further advantage of the present invention is that an apparatus for cleaning cartridge filters is provided that does not need the filter to be removed from its housing.

Another advantage of the present invention is that an apparatus for cleaning cartridge filters is provided that will extend the life of the filter.

A still further advantage of the present invention is that an apparatus for cleaning cartridge filters is provided that saves time.

These and many other objects and advantages of the present invention will no doubt become obvious to those of ordinary skill in the art after having read the following detailed description of the preferred embodiments which are illustrated in the drawing figures.

BRIEF DESCRIPTION OF THE DRAWINGS

FIG. 1 is a side view of a spin-clean fixture embodiment of the present invention for cleaning cartridge filters, and is shown with a commercial cartridge filter being removed after use;

FIG. 2 shows a commercial cartridge filter installed on the spin-clean fixture of FIG. 1 in preparation for washing with a garden hose;

FIG. 5 is a three-dimensional view of a portable handheld spinner embodiment of the present invention for cleaning cartridge filters, and is shown with a commercial cartridge filter ready for installation and hose cleaning;

FIG. 6 shows the commercial cartridge filter installed on the portable handheld spinner of FIG. 1; and FIG. 7 is a side view and partial cross-section through a closed-end cartridge filter in a spin-clean frame embodiment of the present invention.

DETAILED DESCRIPTION OF THE PREFERRED EMBODIMENTS

Figure 3:
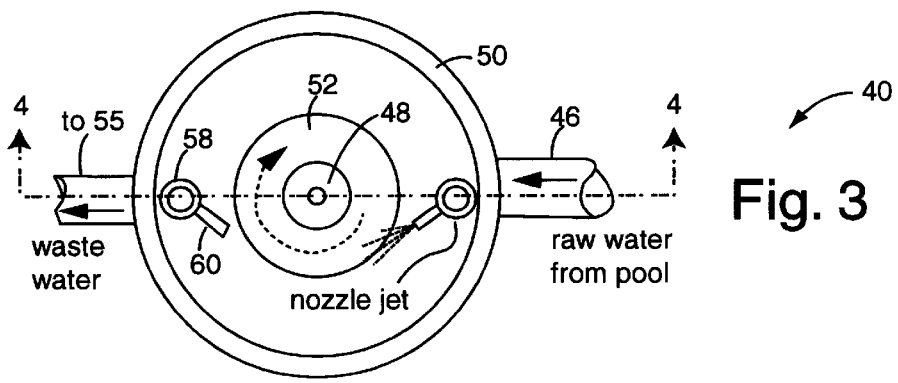
FIG. 3 is a cross sectional diagram of an automatic cleaning embodiment of the present invention for cleaning cartridge filters, and is taken along the lines 3—3 in FIG. 4.

FIGS. 1 and 2 illustrate a spin-clean fixture embodiment of the present invention for cleaning cartridge filters, and is referred to herein by the general reference numeral 10. The spin-clean fixture 10 is able to support a cartridge filter 12 in a way that it can freely spin. A main shaft 14 supports a rotating hollow cylindrical sleeve 16 with low-friction bearings. An ordinary piece of schedule-40¾" PVC pipe can be used for the rotating hollow cylindrical sleeve 16. A pair of adjustable hubs 18 and 20 keep the cartridge filter tight and centered. The adjustable hub 18 can be slipped off (STEP-1) the rotating hollow cylindrical sleeve 16. The cartridge filter 12 may then be slipped off (STEP-2). A rubber handle 22 provides an easy hand grip to control the spin-clean fixture 10 during use. A rubber foot 24 is intended to contact the ground and support the weight of the whole assembly during use.

In preparation for operation, FIG. 2 shows the cartridge filter 12 slipped into place (STEP-3). The hub 18 is slipped on behind it and tightened in place (STEP-4) snug up against the cartridge filter 12. It is preferable to balance the rotating weight of the cartridge filter 12 by centering it on both the hubs 18 and 20. In one prototype unit that was tested, the overall length of the spinner 10 was about forty-eight inches. The cartridge filter used was about thirty-six inches long.

In operation, once the filter 12 is in place, the whole assembly can be leaned up against a backyard fence such that the sleeve 16 and its load, the cartridge filter 12, are free to rotate. A water jet from a garden hose is then directed at one end of the cartridge filter to one side so the cartridge filter begins spinning. The water jet is then worked down slowly to the opposite end while keeping the spinning action going. The process is then repeated, but with the water jet directed to the other side so the cartridge filter spins in the opposite direction. This helps both sides of the longitudinal outside pleats of the filter material to come clean.

Therefore the cleaning is accomplished by centrifugal action and does not involve backwashing. Some prior art filters use centrifugal action to do the main job of filtering, and backwashing with the filter stationary is used for cleaning. The usual cartridge used in a pool or spa filter uses just a simple pleated stationary filter material that is periodically taken out and hosed off.

Figure 4:
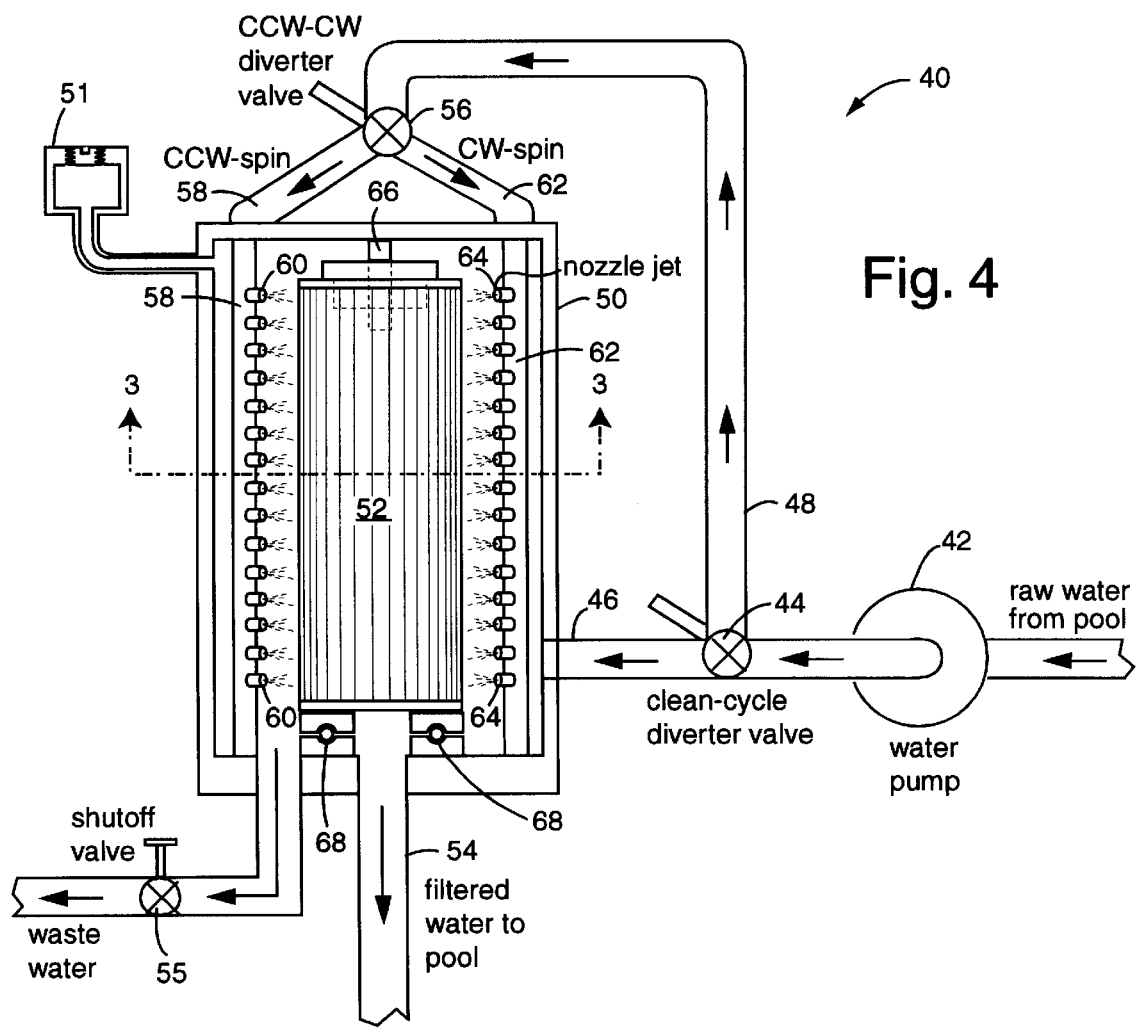
FIG. 4 is a cross sectional diagram of an automatic cleaning embodiment of the present invention for cleaning cartridge filters, and is taken along the lines 4—4 in FIG. 3.

FIGS. 3 and 4 illustrate an in situ self-cleaning cartridge filter system embodiment of the present invention, referred to herein by the general reference numeral 40. In normal filtering mode operation, the system 40 receives raw water from a pool in a water pump 42. A clean-cycle diverter valve 44 allows the pool operator to send water through a pipe 46. During filter-clean operation, the same water is sent instead through a pipe 48. The pipe 46 connects to a filter housing 50. A filler tube 51 allows cleaning fluid to be poured into the filter housing 50. Raw water submerges a cartridge filter 52 within the filter housing 50 during normal filtering mode operation.

The raw water that passes through the system during normal operation is filtered and forced into the interior of the filter cartridge and then out to a pool-return pipe 54. During clean cycles, the diverter valve 44 is changed to direct raw water flow into pipe 48. A drain valve 55 is opened to allow the filter housing 50 to drain. A CCW-CW (counter clockwise-clockwise) diverter valve 56 is set to either its "CCW" or "CW" setting. In the CCW setting, water is directed down a CCW-manifold 58 to a series of nozzle jets 60 all directed to one side of an axis of rotation of the cartridge filter 52 such that the cartridge filter will be spun counter-clockwise (as viewed in FIG. 3). In the CW setting, water is directed down a CW-manifold 62 to a series of nozzle jets 64 all directed to the same side of the axis of rotation of the cartridge filter 52 as are nozzle jets 60. When water is directed down the CW-manifold 62, the cartridge filter will be spun clockwise (as viewed in FIG. 3). A spin-axle 66 and a circular-race bearing 68 allow the cartridge filter to freely turn within the filter housing 50 without significant filter-bypass leakage.

The high pressure water from the multitude of spray nozzles 60 and 64 causes the cartridge filter 52 to spin. The spinning action distributes the jet spray evenly around the cartridge filter 52 element. The spinning action causes loosened dirt particles, grass, leaves, etc. to be thrown off the cartridge filter 52. After a sort time, CCW-CW diverter valve 56 is switched to divert water to the other jet spray manifold. The water impacting the cartridge filter 52 in the opposite direction causes the cartridge filter 52 to reverse direction and helps to clean the back side of folded pleats in the filter material of the cartridge filter 52. Reversing directions also results in varying the speed of rotation.

The cartridge filter 52 gradually builds up speed when the cleaning jets are turned on. Sometime after reaching its optimum rotational velocity, the cleaning jets are reversed. The impact of the water gradually slows down the spinning filter and reverses its direction of rotation. It gradually builds up speed in the opposite direction. During the reversing process and at slow speeds the jets of water have a greater impact on breaking loose dirt from the cartridge filter 52 element, for increased scrubbing action.

At high rotational speeds, the water jets clean less effectively but the increased centrifugal force will pull out the dirty water, debris, etc. from between the folds in the cartridge filter 52 element. The optimum cleaning process might call for the direction to be reversed several times. The water being sprayed against the cartridge filter 52 goes out the open drain. At the end of the cleaning cycle, the pump turns off. Clean-cycle diverter valve 44 is turned back to its normal filtering position and the drain valve 55 is closed.

FIGS. 5 and 6 illustrate a portable handheld spinner embodiment of the present invention for cleaning cartridge filters, and is referred to herein by the general reference numeral 110. The spinner 110 is similar to the spin-clean fixture 10, except that two handles are used instead of one. A cartridge filter 112 can be hose cleaned when installed in the portable handheld spinner 110. A shaft 114 supports a rotating hollow cylindrical sleeve 116 with low-friction bearings. An ordinary piece of schedule-40¾" PVC pipe can be used for the rotating hollow cylindrical sleeve 116. A pair of adjustable hubs 118 and 120 can be slipped up or down on the rotating hollow cylindrical sleeve 116 and locked down with the use of slip rings or rubber compression rings.

Either or both of the adjustable hubs 118 and 120 can be slipped off the spinner 10 to allow the cartridge filter 112 to be slipped on. A pair of rubber handles 122 and 124 provide an easy hand grip to control the spinner 110 during use.

In operation, the hub 120, for example is slipped off as indicated by arrow 126. The cartridge filter 112 is slipped over this end as indicated by arrow 128 and snugged up against the remaining hub 118. It is preferable to balance the rotating weight of the cartridge filter 112 by centering it on both the hubs 18 and 120. The hub 120 is reinstalled and snugged up to the cartridge filter and hand-tighten to lock it down on the sleeve 116. The result is represented in FIG. 6 as an assembly 130.

In one prototype unit that was tested, the overall length of the spinner 110 was about forty-eight inches. The cartridge filter used was about thirty-six inches long. Once the filter 112 is in place, the whole assembly can be leaned up against a backyard fence such that the sleeve 116 and its load, the cartridge filter 112, are free to rotate. A water jet from a garden hose is then directed at one end of the cartridge filter to one side so the cartridge filter begins spinning. The water jet is then worked down slowly to the opposite end while keeping the spinning action going. The process is then repeated, but with the water jet directed to the other side so the cartridge filter spins in the opposite direction. This helps both sides of the longitudinal outside pleats of the filter material to come clean.

FIG. 7 shows a spin-clean frame embodiment of the present invention that is used for filter cartridges with one closed end, and is referred to herein by the general reference numeral 200. A cartridge filter 202, shown here in cross-section, has one open end 204 and one closed end 206. The closed end 206 is cupped in a conical bowl 208 that includes a bearing 210. The cartridge filter 202 is thus able to freely spin on the spindle created by this arrangement. A lower frame yoke 212 supports the bearing 210 and includes a rubber foot 214 that is intended to rest on the ground during use. An upper frame yoke 216 includes a rubber handle 218 and is able to slip up and down on the lower frame yoke 212 and thereby capture and release the cartridge filter 202. A pair of slip joints 220 and 222 allow the upper and lower frame yokes 216 and 212 to be locked together by hand-tightening. An upper bearing 224 allows a centering cone 226 to freely spin and engage the open end 204.

The cleaning operation for the spin-clean frame 200 is essentially the same as that for the spin-clean fixture 10 and the portable handheld spinner 100.

Therefore the cleaning is accomplished by centrifugal action and does not involve backwashing. Some prior art filters use centrifugal action to do the main job of filtering, and backwashing with the filter stationary is used for cleaning. The usual cartridge used in a pool or spa filter uses just a simple pleated stationary filter material that is periodically taken out and hosed off.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A cartridge-filter cleaning device, comprising:
   an upper bearing providing for the capturing and free-spinning support of a cylindrical shaped cartridge filter at a first end;
   a lower bearing providing for the further capturing and free-spinning support of said cylindrical shaped cartridge filter at a second end opposite to said first end, and further providing for a centrifugal balance of said cylindrical shaped cartridge filter when it is spun on an axis; and
   a water source having free access to the cylindrical shaped cartridge filter when captured by the upper and lower bearings and providing for a rotation in both directions by hydraulic action of a jet of water directed from said water source through free space to an outside surface of the cylindrical shaped cartridge filter;
   wherein, said cylindrical shaped cartridge filter can be cleaned by said jet of water from a handheld hose and nozzle while spinning and centrifugal force assists in such cleaning.

2. A cartridge-filter cleaning device, comprising:
   a non-rotating pivot shaft with a handhold at a top end and a foot rest at a bottom end, and that can be placed on a floor support and held at a tilt angle by hand;
   a hollow cylindrical sleeve that is free to rotate on and is attached to the pivot shaft;
   a first hub with an attachment to a first portion of the cylindrical sleeve, and providing for the fixturing of a first end of a hollow cylindrical cartridge filter; and
   a second hub with an attachment to a second portion of the cylindrical sleeve, and providing for an installation and removal of said cartridge filter past its location on said second portion of the cylindrical sleeve, and further providing for the fixturing of a second end of said cartridge filter;
   wherein the hollow cylindrical sleeve and the first and second hubs cooperatively allow said cartridge filter to be coaxially spun about said stationary pivot shaft to create a centrifugal force within said cartridge filter to dislodge and remove filter debris.

3. The device of claim 2, wherein:
   at least one of the first and second hubs includes a slip mechanism that allows the position of the corresponding hub to be adjusted along the length of the hollow cylindrical sleeve.

4. The device of claim 2, wherein:
   at least one of the first and second hubs includes a hand-tightened slip-ring mechanism that allows the position of the corresponding hub to be adjusted along the length of the hollow cylindrical sleeve by a user without the use of tools.

5. A swimming-pool water-filter system, comprising:
   a vertically oriented cylindrical filter housing with a supply connection to receive raw water from a swimming pool and a water-circulating pump, a waste-water drain, and a return connection to return filtered water to said swimming pool;
   a free-spinning hollow cylindrical filter cartridge mounted within the filter housing on a vertical axis, and providing a filtered-water return through said return connection from an inner surface of a pleated filter material, wherein said raw water is directed inside the filter housing to an outside surface of said pleated filter material; and
   a fixed-position plurality of water nozzles disposed inside the filter housing and directed to form a water jet in a plane all along a vertical longitudinal line of an outside surface of said pleated filter material at a non-intersecting angle off said vertical axis enough to support a spin-cleaning of the filter cartridge in a first direction of rotation;

wherein, said water jet is supported by a pressurization of said raw water by said swimming pool water circulating pump; and wherein, any of said raw water that does not penetrate said filter material falls free of the filter cartridge together with any debris that was trapped and is carried away by said waste-water drain during a cleaning cycle, and any of said raw water that does penetrate said filter material is filtered by such penetration and is returned as filtered water through said return connection to said swimming pool.

6. The swimming-pool water-filter system of claim 5, wherein:

the filter cartridge is mounted within the filter housing such that said pleated filter material is not submerged in a bath of accumulated water during a cleaning cycle.

* * * * *